United States Patent Office 3,715,235
Patented Feb. 6, 1973

3,715,235
PROCESS FOR THE REMOVAL OF IMPURITIES FROM TECHNICAL SUGAR SOLUTIONS
Erich Moebes, Enns, Austria, and Hans Hitzel, Frankfurt am Main, Germany, assignors to Sugar Chemical Co., Etablissement Vaduz/Furstentum, Liechtenstein
No Drawing. Filed Oct. 12, 1971, Ser. No. 188,581
Claims priority, application Austria, Oct. 16, 1970, 9,364
Int. Cl. C13d 3/14
U.S. Cl. 127—46 A    6 Claims

ABSTRACT OF THE DISCLOSURE

Technical sugar solution is pretreated by ion exchange with carbonate and/or bicarbonate exchangers in combination with an ammonium or weakly acidic cation exchanger in the hydrogen form. The pretreated solution or a solution obtained after removal of a portion of the sugar by crystallization from the pretreated solution is brought into ion exchange contact with a cation exchanger in the hydrogen form. The resulting solution is recycled to and passed through the carbonate and/or bicarbonate exchanger employed in the pretreatment step without prior regeneration of that exchanger.

FIELD OF INVENTION

The invention generally relates to the removal of non-sugar materials—hereinafter referred to as impurities or contaminants—from technical sugar solutions.

More specifically the invention is concerned with a process for the removal of contaminants from technical sugar solutions which have been pretreated with carbonate- and/or bicarbonate ion exchangers in combination with an ammonium ion exchanger or a weakly acidic cation ion exchanger in the hydrogen form, and from which any content of ammonia and carbonic acid has been at least partially removed.

BACKGROUND INFORMATION AND PRIOR ART

For the purpose of purifying technical sugar solutions, it has previously been proposed to subject the solution to ion exchange treatment wherein the solution is successively passed through a strongly acidic cation exchanger in the hydrogen form and a weakly basic anion exchanger in the molecular form. Although this procedure has been used to some extent in the sugar industry, it is well known that it has important disadvantages. The primary drawback of this prior art procedure is thus that at the most 60% of the sugar solution can be treated in this manner since a more extensive purification cannot be accomplished due to color instability of the purified sugar solution. The regeneration of the ion exchangers is effected with sulfuric acid and alkali metal hydroxide or ammonia.

It has also been suggested to treat technical sugar solutions with a combination of strongly basic anion exchangers charged with carbonic acid and cation exchangers whose active sites are occupied by ammonium ions. In this manner the technical sugar solutions are substantially decolorized and about 30 to 45% of the contaminants are removed. A variation of the last mentioned procedure makes use, for the same purpose, of a combination of anion exchangers charged with carbonic acid and a weakly acidic cation exchanger in the hydrogen form. Both processes have the disadvantage that the employed anion exchanger can be exhausted to a very incomplete extent only. This in turn results in most incomplete removal of the contaminants from the technical sugar solutions so that in the final result only about 30 to 45% of the contaminants are removed. Further, the entire amount of betaine and a large amount of the aminoacids are not exchanged but remain in the sugar solution, thus contributing to molasses formation. The unsatisfactory utilization of the anion exchangers makes it necessary to employ relatively large amounts of exchangers which considerably increases the costs of the procedure, particularly since the anion exchangers cannot be regenerated due to irreversible charging and thus have to be discarded after a single use.

More recently the so-called Decolmin-process has been introduced for the purification of technical sugar solutions which essentially consists in a combination of an acidic variation of the carbonate procedure with the conventional acidic complete salt removal procedure as described above.

SUMMARY OF THE INVENTION

It is a primary object of the invention to overcome the disadvantages of the prior art purification procedures and to provide a procedure for the removal of contaminants from technical sugar solutions which is superior to known procedures and which results in effective removal of the contaminants in a relatively simple and inexpensive manner.

Another object of the invention is to propose a process of the indicated kind which permits for easy regeneration of the ion exchangers.

Briefly and in accordance with the invention, it has surprisingly been ascertained that a strongly basic anion ion exchanger whose active sites originally were charged with $CO_3$-ions, which partially have been exchanged against anions of a technical sugar solution and thus is charged with such anions, is capable of accepting additional anions from a technical sugar solution if these additional anions are presented in the form of free acids. The anion exchanger is then capable of accepting the additional anions without releasing the anions which have previously replaced the original $CO_3$-ions. In this manner, it is possible to charge the anion ion exchanger with the anions of a technical sugar solution to a much larger extent than it is possible by merely exchanging $CO_3$-ions for anions of a contaminated sugar solution. The inventive procedure renders it possible almost completely to remove contaminants or impurities from technical sugar solutions without having to forego the advantages of the known prior art exchange of anions for $CO_3$-ions.

Accordingly, the crux of the present invention is that a technical sugar solution which has been pretreated with carbonate-and/or bicarbonate exchangers in combination with an ammonium exchanger or a weakly acidic cation exchanger in the hydrogen form, and from which any ammonia and carbonic acid has been at least partially removed, is subjected to a further purification treatment according to which the solution is treated with a cation exchanger in the hydrogen form and the thus treated solution is recycled to the carbonate-and/or bicarbonate exchangers. In accordance with the invention the solution to be subjected to the inventive treatment may first be concentrated so as to crystallize a part of the sugar contained in the solution.

Considered from a practical point of view, the inventive procedure may be carried out in several stages or steps as follows:

Step 1: 16 to 20 volumes of a diluted sugar solution with a dry solid content of about 15% and having a sugar content of 85 to 95% calculated on the dry solid content, are percolated through a combination of a strongly basic, macroporous anion ion exchanger with a strongly basic anion ion exchanger in gel form. Both anion exchangers had been brought in the carbonate and/or bicarbonate form by treatment with ammonium carbonate so that the active sites of the exchangers were thus occupied by carbonate and/or bicarbonate. The resulting sugar solution was decolorized and, due to the ion exchange, contained alkali metal carbonate. In order to remove the alkali metal carbonate, the solution is thus brought into ion exchange contact with an ammonium exchanger or with a very weakly acidic cation exchanger in the hydrogen form. The formed ammonium carbonate was removed by boiling.

Step 2: The thus pretreated sugar solution was concentrated for the purpose of removing sugar by crystallization. The concentration and crystallization was continued until the sugar content of the solution had dropped to 70 to 80% calculated on the dry solid content.

Step 3: The mother liquor remaining after the crystallization was now percolated through a sufficient amount of a strongly acidic cation exchanger in the hydrogen form, in order to remove residual cations, residual aminoacids and betaine. With a view to avoiding inversion losses, the last mentioned treatment of the sugar solution has to be carried out at relatively low temperatures as, for example, about 10° C.

Step 4: The acidic sugar solution obtained from step 3 is now passed through the anion exchangers which were used for the prepurification of the sugar solution in step 1. The anion exchangers of step 1 are used in step 4 without regeneration, resulting in the absorption of the free acids contained in the acidic sugar solution. From the mother liquor obtained after step 2, a sugar solution is obtained which contains 90 to 98% of sugar, calculated on the dry solid content, while contaminants are largely removed.

The invention will now be described by several examples, it being understood, however, that these examples are given by way of illustration and not by way of limitation and that many changes may be effected without affecting in any way the scope and spirit of the invention as recited in the appended claims. Unless otherwise indicated, all percentages are percent by weight, unless the percentage indicates the capacity of the ion changers.

EXAMPLE 1

Step 1: This experiment was carried out with a technical sugar solution of the following composition:

Dry solid content: 15.0 grams in 100 grams of solution
Sugar: 13.6 grams in 100 grams of solution
Sugar content: 90.6%, calculated on dry solid content
Alkali metal carbonate: 4.0 mval. per liter 10.0 liters of this solution which thus contained 1440 grams of sugar and 150.0 grams of contaminants were percolated at 70° C. through 200 cm.$^3$ of a macroporous decolorization resin (Lewatit MP 500A) and subsequently through 400 cm.$^3$ of a strongly basic anion exchanger in gel form (Lewatit M 500). Both anion exchangers were in the $CO_3$-form. The sugar solution obtained after the ion exchange contained 32.0 mval. $CO_3$ in the form of alkali metal carbonate or bicarbonate per liter of solution. 280 mval. anions of the sugar solution were exchanged against $CO_3$-ions. In order to remove the alkali metal carbonate, the sugar solution was now treated with 100 cm.$^3$ of a weakly acidic cation ion exchanger in the hydrogen form. The sugar solution had thereafter the following composition:

Dry solid content: 14.49 grams
Sugar: 13.6 grams
Sugar content: 93.9% calculated on dry solid content
pH: 8.4

The solution contained 1440 grams of sugar, 93.0 grams of contaminants which corresponds to 62% of the original contaminant content. Thus, 38.0% of the contaminants had been removed.

Step 2: The sugar solution was now brought to crystallization until the remaining mother liquor had the following composition:

Dry solid content: 47.25
Sugar: 33.55
Sugar content: 71.01% calculated on dry solid content The solution contained 228 grams of sugar and 93.0 grams of contaminants.

Step 3: This mother liquor, after dilution, was passed through 400 ml. of a strongly acidic cation ion exchanger in the hydrogen form. The percolation was effected at a temperature of 10° C.

Step 4: The thus obtained acidic solution which contained a total of 192.5 mval. of free acids was now recycled to the anion ion exchanger of step 1 which thus was already charged with anions from the technical sugar solution. Without regeneration of this anion exchanger the sugar solution obtained from step 3 was percolated through the anion ion exchanger of step 1. The sugar solution emanating from the anion exchanger had the following composition (after concentration):

Dry solid content: 52.9
Sugar: 49.05
Sugar content: 92.72% calculated on dry solid content
pH: 7.3

The purified sugar solution contained:

228 grams of sugar
17.8 grams of contaminants which equals 12.0% of the original content of contaminants. This means that 88% of the non-sugar materials or contaminants had been removed from the technical sugar solution. This meant that the sugar yield from the purified sugar solution increased from 84.4% to 98.8%.

The regeneration of the exhausted anion ion exchanger with ammonium carbonate yielded the following result:

Decolorizing exchanger Lewatit MP 500A: 118 mval. anions/200 cm.$^3$=590 mval./liter exchanger
Carbonate exchanger Lewatit M 500: 360 mval. anions/400 cm.$^3$=900 mval./liter exchanger The charge of the carbonate exchanger was accordingly 478 mval. for 600 ml. of exchanger while in respect to the $CO_3$-exchange only 280 mval. were reached. This means an increase in the usable capacity of the anion ion exchangers of 180% of the value which can be obtained with the carbonate exchange. The acceptance capability of the anion ion exchangers for contaminants increased from 57 grams to 132 grams=232%.

The described example demonstrates the possibility to free a technical sugar solution almost completely from contaminants. However, this is only possible from a practical point of view, if the sugar solution contains very small amounts of raffinose since a content of about above 6% of raffinose calculated on the dry solid content leads to disturbances in the crystallization of saccharose. For this reason, the mother liquor to be treated with a cation exchanger must be divided, the division being dependent on the raffinose content of the sugar solution to be processed, in such a manner that the raffinose which is contained in the remaining untreated portion of the mother liquor can be removed from the crystallization procedure without disturbing the crystallization. The inventive procedure also offers the possibility to purify extremely impure technical sugar solutions as, for example, molasses or a pre-product of molasses and to recover the sugar contained therein by crystallization. This is demonstrated in the following example.

EXAMPLE 2

This experiment was carried out with molasses of the following composition:

Dry solid content: 84.3
Sugar: 52.30
Purity: 62.0
pH: 8.4

Ash (SO$_4$): 11.89% calculated on dry solid content
N$_2$: 2.75 calculated on dry solid content
Invert sugar: 0.297% calculated on dry solid content
Betaine: 7.08% calculated on dry solid content 400.0 grams of this molasses containing 337.0 grams of dry substance, 209.0 grams of sugar and 128.0 grams of contaminants were, after a suitable dilution, passed, as in Example 1, through 200 ml. of a macroporous, strongly basic anion exchanger and thereafter through 400 ml. of a strongly basic anion exchanger in gel form. Both anion exchangers had been brought into the carbonate form by treatment with ammonium carbonate. For the purpose of removing the alkali metal carbonate, the molasses solution was percolated through a weakly acidic cation exchanger in the hydrogen form. The concentrated molasses had thereafter the following composition:

Dry solid content: 44.10
Sugar: 31.95
Purity: 72.45
pH: 8.50
Ash (SO$_4$): 7.615% calculated on dry solid content
Nitrogen: 2.673% calculated on dry solid content
Betaine: 11.42% calculated on dry solid content The solution contained:

209 grams of sugar
288 grams of dry substance
79 grams of non-sugar materials

The amount of contaminants removed was 49 grams=38.3%.

This solution was percolated through 400 ml. of a strongly acidic cation exchanger in the hydrogen form. The percolation was effected at 9.0° C. The solution thus obtained had the following composition:

Dry solid content: 13.7
Sugar: 12.20
Purity: 89.05
pH: 2.25
Nitrogen: 0.647% calculated on dry solid content This acidic solution was now percolated through the unregenerated anion exchangers which previously had exchanged a portion of the anions against CO$_3$-ions and in so doing had accepted 49 grams of non-sugar contaminants. A sugar solution of the following composition was obtained:

Dry solid content: 49.16
Sugar: 47.40
Purity: 96.43
pH: 7.4
Ash (SO$_4$): 0.640% calculated on dry solid content
Nitrogen: 0.273% calculated on dry solid content
Betaine: 0.37% calculated on dry solid content The sugar solution contained:

209 grams of sugar
217 grams of dry substance, and
8.0 grams of contaminants

This means that 120 grams of non-sugar contaminants, which equals 93.7%, had been removed from the original molasses. Under the assumption that with the non-sugar materials remaining in the sugar solution a molasses of a purity of 60.0 is formed, this means that 197 grams=94.2% of the sugar can be recovered.

Lewatit MP 500A and Lewatit M 500 are manufactured by Farbenfabriken Bayer, Leverkusen, Germany.

Lewatit MP 500A is a microporous, strongly basic anion exchanger comprising a copolymer of polystyrene and divinylbenzene. The active group is a quaternary ammonium compound.

Lewatit M 500 is a strongly basic anion exchanger in gel form. The matrix consists of a copolymer of polystyrene and divinylbenzene. The active group is a quaternary ammonium compound.

What is claimed is:

1. In a process for removing contaminants from a technical sugar solution, wherein the solution is pretreated by ion exchange with carbonate and/or bicarbonate ion exchangers in combination with an ammonium exchanger or a weakly acidic cation exchanger in the hydrogen form and wherein any content of ammonia and carbonic acid is at least partially removed, the improvement which comprises that the solution resulting from the pretreatment or a solution obtained after concentration and crystallization of a part of the sugar is brought into ion exchange contact with a cation ion exchanger in the hydrogen form, whereupon the resulting solution is recycled to and passed through the carbonate and/or bicarbonate exchangers of said pretreatment.

2. The improvement as claimed in claim 1, wherein the solution obtained after the ion exchange with the cation exchanger in the hydrogen form is recycled to and passed through said carbonate and/or bicarbonate exchangers of said pretreatment without prior regeneration of said carbonate and/or bicarbonate exchangers so that said carbonate and/or bicarbonate exchangers are partially charged with anions emanating from the technical sugar solution which was pretreated with said carbonate and/or bicarbonate exchangers.

3. A process of removing contaminants from technical sugar solutions comprising:
    (a) establishing ion exchange contact between the technical sugar solution and a strongly basic anion exchanger whose active sites are occupied by carbonate and/or bicarbonate, whereby a portion of the carbonate and/or bicarbonate is exchanged for anions of the solution and alkali metal carbonate and/or bicarbonate is introduced into the solution;
    (b) removing at least partially said alkali metal carbonate and/or bicarbonate from the solution;
    (c) removing a portion of the sugar in the solution by crystallization;
    (d) passing the solution of step (c) through a strongly acidic cation ion exchanger in the hydrogen form at a temperature sufficiently low so as to prevent inversion losses and
    (e) passing the solution obtained in step (d) through the unregenerated anion exchangers obtained in step (a).

4. A process as claimed in claim 3, wherein the temperature of step (d) is about 10° C.

5. A process as claimed in claim 3, wherein the removal of the alkali metal carbonate and/or bicarbonate of step (b) is effected by bringing the solution into ion exchange contact with an ammonium ion exchanger or a weakly acidic cation exchanger in the hydrogen form.

6. A process as claimed in claim 3 wherein the crystallization of step (c) is carried out until the sugar content of the solution is about 70 to 80% calculated on the dry solid content of the solution.

References Cited
UNITED STATES PATENTS

| | | | |
|---|---|---|---|
| 3,618,589 | 11/1971 | Tavani | 127—46 A |
| 3,090,707 | 5/1963 | Moebes | 127—46 A |
| 2,911,329 | 11/1959 | Blann | 127—46 R |
| 2,534,560 | 12/1950 | Shafor | 127—46 A |

MORRIS O. WOLK, Primary Examiner

S. B. DAVIS, Assistant Examiner